(12) United States Patent
Elston et al.

(10) Patent No.: US 11,074,550 B2
(45) Date of Patent: Jul. 27, 2021

(54) INVENTORY MANAGEMENT APPLICATION FOR SALES CONSULTANT USERS

(71) Applicant: Mary Kay Inc., Dallas, TX (US)

(72) Inventors: Hope Elston, Addison, TX (US); John Kreusch, Addison, TX (US); Jamie Schott, Addison, TX (US)

(73) Assignee: Mary Kay Inc., Addison, TX (US)

( * ) Notice: Subject to any disclaimer, the term of this patent is extended or adjusted under 35 U.S.C. 154(b) by 308 days.

(21) Appl. No.: 15/248,871

(22) Filed: Aug. 26, 2016

(65) Prior Publication Data

US 2018/0018628 A1    Jan. 18, 2018

Related U.S. Application Data

(60) Provisional application No. 62/361,431, filed on Jul. 12, 2016.

(51) Int. Cl.
| | | |
|---|---|---|
| *G06Q 10/08* | (2012.01) | |
| *G06Q 30/00* | (2012.01) | |
| *G06Q 30/06* | (2012.01) | |

(52) U.S. Cl.
CPC ..... *G06Q 10/0875* (2013.01); *G06Q 30/0635* (2013.01)

(58) Field of Classification Search
CPC .. G06Q 10/06; G06Q 10/087; G06Q 10/0635; G06Q 10/0875
See application file for complete search history.

(56) References Cited

U.S. PATENT DOCUMENTS

| | | |
|---|---|---|
| 5,712,989 A | 1/1998 | Johnson et al. |
| 7,574,383 B1 | 8/2009 | Parasnis et al. |
| 7,801,776 B2 * | 9/2010 | Inskeep ............ G06Q 30/0633 705/28 |
| 7,881,987 B1 * | 2/2011 | Hart ................ G06Q 30/0603 705/28 |
| 8,473,359 B2 | 6/2013 | Yeung |
| 2001/0051905 A1 * | 12/2001 | Lucas ............... G06Q 10/087 705/29 |
| 2002/0010659 A1 | 1/2002 | Cruse et al. |
| 2002/0138399 A1 | 9/2002 | Hayes et al. |
| 2002/0174038 A1 | 11/2002 | Chien |
| 2003/0078858 A1 | 4/2003 | Angelopoulos et al. |
| 2003/0088442 A1 | 5/2003 | Michael et al. |
| 2005/0197929 A1 * | 9/2005 | Lucas ............... G06Q 30/0601 705/28 |
| 2006/0085298 A1 * | 4/2006 | Inskeep ............ G06Q 30/0633 705/28 |

(Continued)

*Primary Examiner* — Talia F Crawley
(74) *Attorney, Agent, or Firm* — Norton Rose Fulbright US LLP

(57) ABSTRACT

A mobile application may be used to track sales consultants' businesses, such as by tracking a local inventory maintained by the consultant. Determining whether local inventory is sufficient for fulfilling a sales order may be assisted by updating a database of the application with restocking information. Such restocking information may be obtained through a camera of the mobile device scanning a barcode or QR code or other information, such as recognizing text on a package. Information in the picture may be associated with inventory restocking information or be used to fetch restocking information.

23 Claims, 14 Drawing Sheets

(56) References Cited

U.S. PATENT DOCUMENTS

| | | | |
|---|---|---|---|
| 2007/0124216 A1* | 5/2007 | Lucas | G06Q 30/02 705/26.1 |
| 2007/0250430 A1 | 10/2007 | Sholtis et al. | |
| 2008/0281725 A1* | 11/2008 | Greer | G06Q 20/203 705/22 |
| 2011/0010261 A1* | 1/2011 | Inskeep | G06F 16/903 705/26.1 |
| 2012/0221434 A1* | 8/2012 | Inskeep | G06Q 30/0633 705/26.8 |
| 2013/0138452 A1 | 5/2013 | Cork et al. | |
| 2013/0226739 A1* | 8/2013 | Inskeep | G06Q 30/0633 705/26.81 |
| 2014/0091901 A1 | 4/2014 | Naley et al. | |
| 2014/0156469 A1* | 6/2014 | Inskeep | G06Q 10/087 705/26.81 |
| 2014/0207621 A1 | 7/2014 | Tendy | |
| 2014/0297348 A1 | 10/2014 | Ellis | |
| 2017/0286899 A1* | 10/2017 | Deshpande | G06Q 10/087 |

\* cited by examiner

INVENTORY MANAGEMENT APPLICATION FOR SALES CONSULTANT USERS

CROSS-REFERENCE TO RELATED PATENT APPLICATIONS

This application claims the benefit of U.S. Provisional Patent Application No. 62/361,431, filed Jul. 12, 2016. The contents of the referenced application are incorporated into the present application by reference.

FIELD OF THE DISCLOSURE

The instant disclosure relates to software. More specifically, portions of this disclosure relate to software for assisting sales persons with managing commerce, such as tracking customers, managing inventory, and fulfilling orders.

BACKGROUND

Electronic commerce has opened new possibilities for selling products to large markets without maintaining physical presences in multiple locations. Purchasers can visit a seller's website, place orders, and receive merchandise regardless of the distance between the buyer's physical location, the seller's physical location, and the physical location of the goods. Because of the access to large markets and convenience of shopping on the Internet, electronic commerce has taken market share from traditional brick-and-mortar stores. The conventional electronic commerce model is to have goods located at one or a few central warehouses. When an order is received through the Internet the goods are collected, boxed, and delivered to the buyer. However, a consequence of the purchaser not being present at a store where the goods are located is that the goods are not instantly available to the purchaser. Boxing and delivery of the goods conventionally takes at least 1-2 days, if not more. Customers often want the thrill of receiving goods immediately, or may have an immediate need for the good.

SUMMARY

A solution to the shortcomings of the conventional electronic commerce model described above has been discovered. One such solution of the present invention is providing sales consultants access to computer software to track local inventory and fulfill orders from multiple fulfillment sources, which may include fulfilling from a local inventory. Determining whether local inventory is sufficient for fulfilling a sales order may be assisted by updating a database with restocking information. Such restocking information may be obtained using a camera of the mobile device to scan a barcode, to scan a QR code, or to recognize text on a package. Information in the picture may be associated with inventory restocking information or be used to fetch information restocking information.

According to one embodiment of the present invention, a method may include receiving customer information for a plurality of customers associated with a sales consultant user; receiving local stock information for goods stocked by the sales consultant user; receiving a stock replenishment package identifier for a package containing goods shipped from a central warehouse; updating the local stock information for the sales consultant user based on the received stock replenishment package identifier; receiving a sales order for one of the plurality of customers; determining whether the goods stocked by the sales consultant user are sufficient to fulfill the received sales order; and, if not, transmitting a request for the central warehouse to ship one or more items of the received sales order to the one of the plurality of customers.

The foregoing has outlined rather broadly certain features and technical advantages of embodiments of the present invention in order that the detailed description that follows may be better understood. Additional features and advantages will be described hereinafter that form the subject of the claims of the invention. It should be appreciated by those having ordinary skill in the art that the conception and specific embodiment disclosed may be readily utilized as a basis for modifying or designing other structures for carrying out the same or similar purposes. It should also be realized by those having ordinary skill in the art that such equivalent constructions do not depart from the spirit and scope of the invention as set forth in the appended claims. Additional features will be better understood from the following description when considered in connection with the accompanying figures. It is to be expressly understood, however, that each of the figures is provided for the purpose of illustration and description only and is not intended to limit the present invention.

BRIEF DESCRIPTION OF THE DRAWINGS

For a more complete understanding of the disclosed system and methods, reference is now made to the following descriptions taken in conjunction with the accompanying drawings.

FIG. 5 is a screenshot of an example use of a camera for identifying contents of a replenishment shipment according to one embodiment of the disclosure.

FIG. 13 is a screenshot of an example use of a mobile device to specify a replenishment order according to one embodiment of the disclosure.

DETAILED DESCRIPTION

Figure 1:
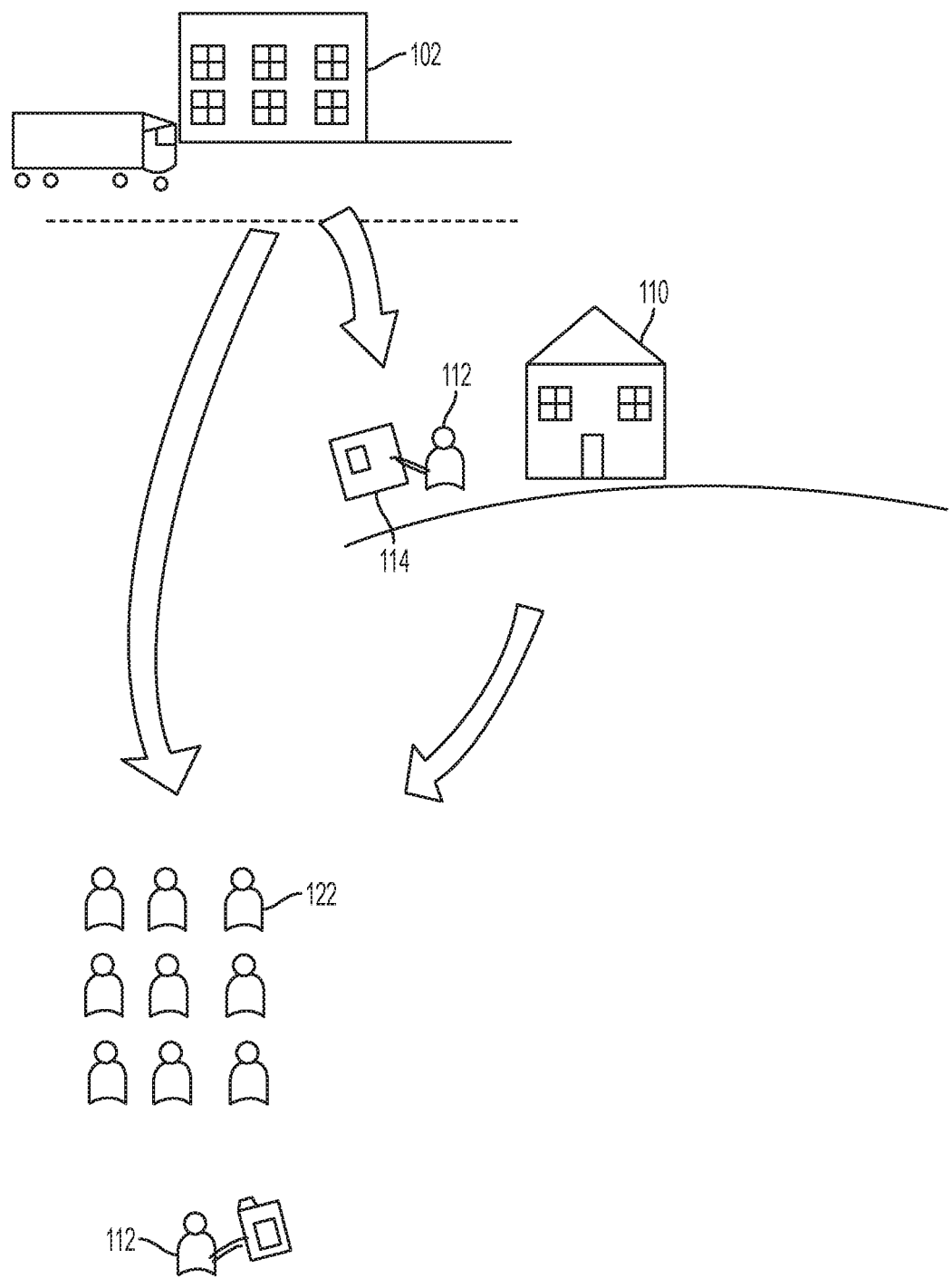
FIG. 1 is an illustration of a business model involving a sales consultant user according to some embodiments of the disclosure.

FIG. 1 is an illustration of a business model involving sales consultant users according to some embodiments of the disclosure. Sales consultant users 112 may be located throughout a geographical region. These sales consultant users 112 may store goods in local inventory 110 at diverse geographical locations. Goods may also be stored in one or a few central warehouses 102. Goods may be delivered from the warehouse central inventory 102 in replenishment packages 114 to restock local inventory 110 of the sales consultant users 112. The local inventory 110 for each sales consultant user 112 may be customized to each consultant's business and/or customers. The sales consultant users 112 may make sales to customers 122 through meetings. These sales may be fulfilled from local inventory 110 or central inventory 102. Further, different fulfillment methods may be used to fulfill orders from the inventories 102 and 110. For example, when an order is fulfilled from local inventory 110 the goods may be hand-delivered or shipped. As another example, when an order is fulfilled from central inventory 102 the order may require interaction with the sales consultant user 112 or the order may be automatically shipped without interaction from the sales consultant user 112. The multitude of options for delivering goods from such a business model improves upon the conventional electronic commerce model. However, implementing and managing the multitude of fulfillment techniques requires new technology. Embodiments of the invention describe herein address techniques for managing commerce through different fulfillment methods. Further, embodiments of the invention may support fulfillment of goods from sales consultant users for Internet-based sales orders.

Figure 2:
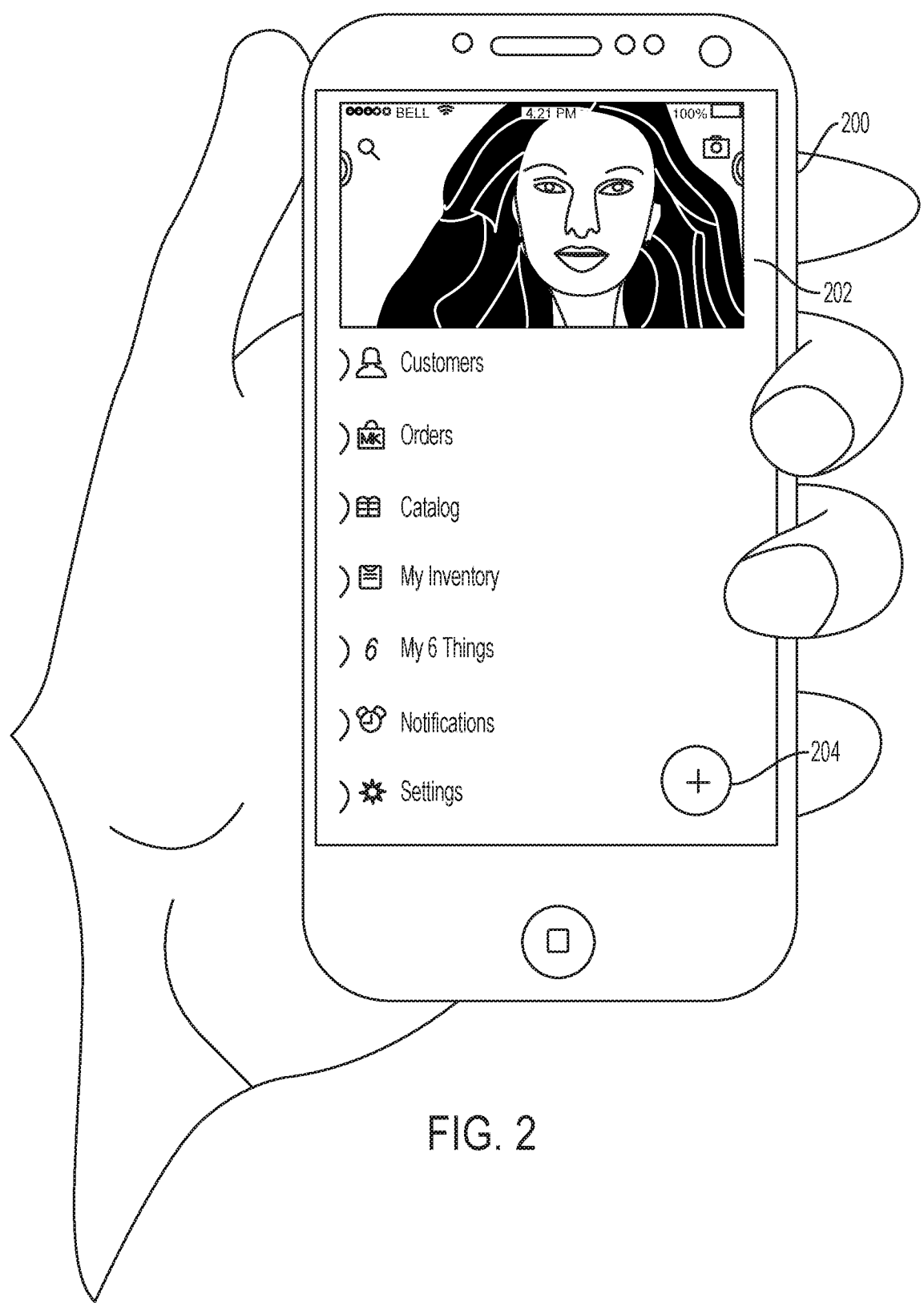
FIG. 2 is a screenshot of an example mobile application for a sales consultant user to manage orders and local inventory according to one embodiment of the disclosure.

FIG. 2 is a screenshot of an example mobile application for a sales consultant user to manage orders and local inventory according to one embodiment of the disclosure. A user interface 202 may be displayed on a mobile device 200 for managing a sales consultant user's business. The user interface 202 may include menus relating to customers, orders, product catalog, managing inventory, and tracking reminders and tasks associated with customers or other aspects of the consultant's business, among other options. For example, the user interface 202 may provide access to further aspects of a mobile application or other mobile applications that allow searching for customers, orders, or products, using a camera to scan products or shipping labels, adding customers, starting new orders, organizing customers, connecting with customers, managing orders, creating orders, browsing a product catalog, tracking local inventory, tracking tasks, receiving reminders, receiving notifications, editing a profile, and managing security settings. As another example, the user interface 202 may provide access to search functionality for text-based searching a database for customer information, previous sales orders, and other information by receiving a text string and displaying results. A pop-up button 204 may be provided in portions of the mobile application for quickly accessing certain features. In some embodiments, the pop-up button 204 may be present throughout operation of the mobile application. Clicking, touching, or otherwise activating the pop-up button 204 may cause a menu to be displayed, such as the menu shown in FIG. 3.

Figure 3:
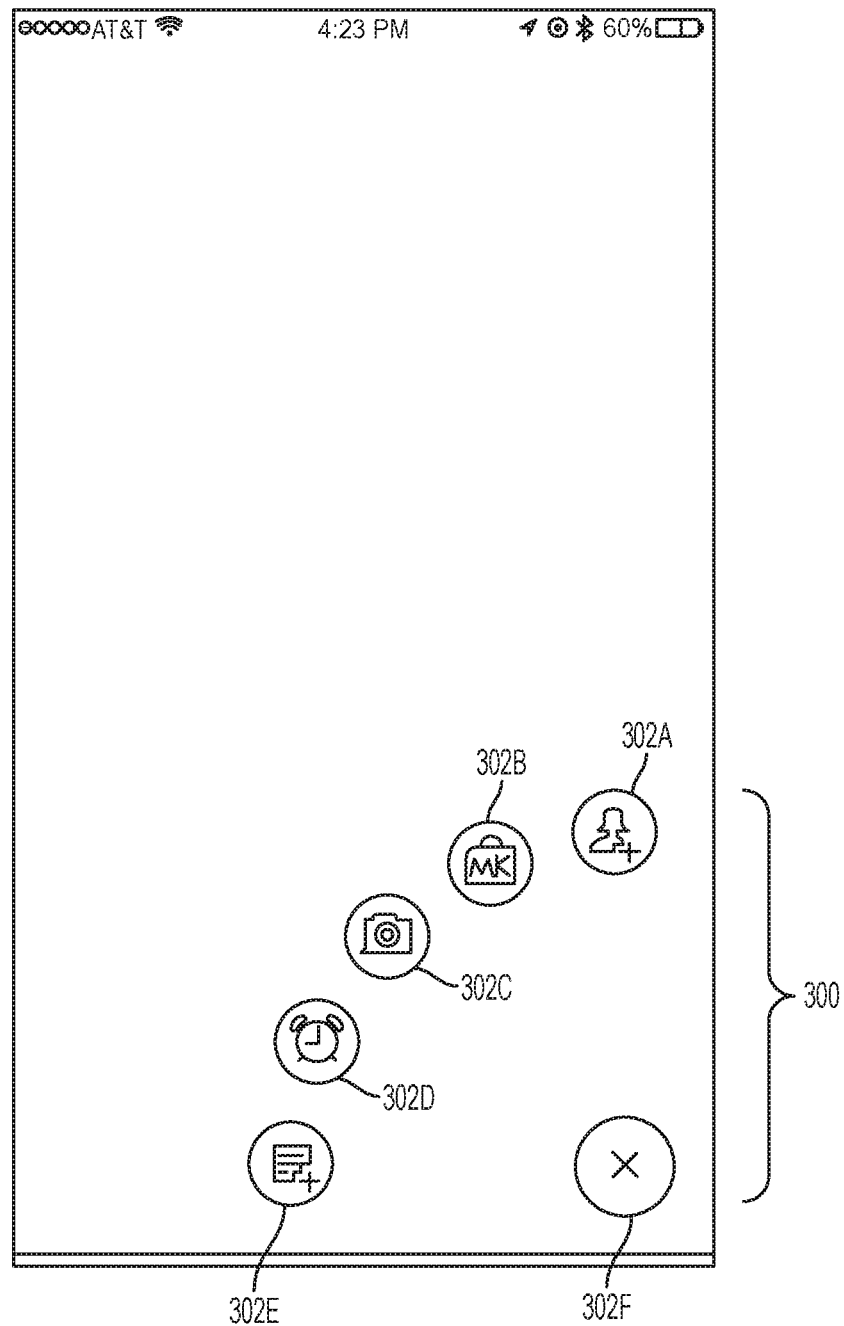
FIG. 3 is a screenshot of an example menu for a sales consultant user to interact with a mobile application to provide user input according to one embodiment of the disclosure.

FIG. 3 is a screenshot of an example menu for a sales consultant user to interact with a mobile application to provide user input according to one embodiment of the disclosure. A menu 300 may be overlaid on the mobile application, and display of the menu 300 may include darkening, dimming, blurring, or otherwise obscuring the main display of the mobile application. The menu 300 may include a plurality of command buttons 302A-E and a close button 302F. The command buttons 302A-E may provide easy access to frequently used tasks. In some embodiments, the commands associated with buttons 302A-E may be fixed. In some embodiments, the commands associated with buttons 302A-E may be dynamic and personalized to a particular sales consultant user or group of sales consultant users. In the example menu 300 shown in FIG. 3, the command buttons 302A-E may correspond to commands for adding a new customer, creating a new order, taking a picture, creating a reminder, and adding a note, respectively. The close button 302F may be activated to close the menu 300 and return to the user's prior screen in the mobile application or a home screen of the mobile application. When the user clicks command button 302C for taking a picture, the mobile device may activate a camera and assist the user in taking a picture. The image data of the picture may be processed to obtain information used by the mobile application. In one example, a picture may be processed to identify a product in a picture and recall information about that product. In another example, a picture may be processed to identify a package and recall information about replenishment goods contained in the package, which may then be used to update a database of goods in local inventory. These examples are illustrated and described in more detail with reference to FIG. 4 and FIG. 5 below.

Figure 4:
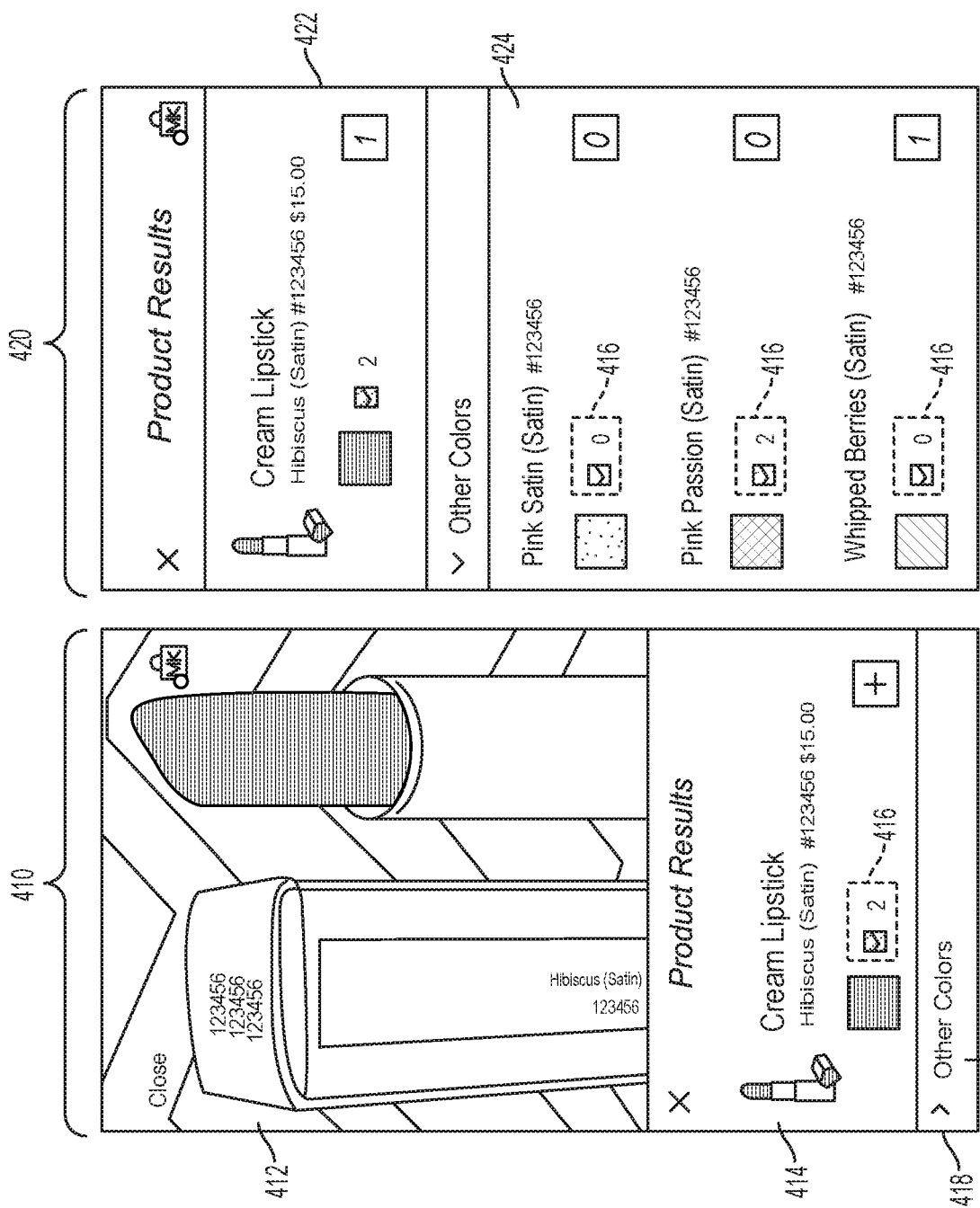
FIG. 4 is a screenshot of an example use of a camera for identifying product information according to one embodiment of the disclosure.

The camera of a mobile device may be used by the mobile application to assist a sales consultant user in identifying a product. After clicking the command button 302C to take a picture, or otherwise activating the camera, the user may take a picture of a product. The picture of the product may be processed, either locally by the mobile application or remotely by a server, to identify the product and obtain information about the product and display information in a user interface as shown in FIG. 4. FIG. 4 is a screenshot of an example use of a camera for identifying product information according to one embodiment of the disclosure. A first screen 410 may include a portion or all of the picture taken by the user in a first area 412 and include an identification of the product in a second area 414. The product identification in area 414 may include product name, product color, product identifier or SKU, and/or product retail price. Further, the product information in area 414 may include information unique to a sales consultant user, such as an indication 416 of quantity of the product available in the consultant's local inventory. A button 418 may be activated to provide further information regarding the identified product, related products, or variations of the product in a second screen 420. For example, the second screen 420 may include a first area 422 displaying the product details similar to area 414 of the first screen 410, such as to provide continuity between the screens 410 and 420, while additional information is displayed in a second area 424. The second area 424 may include a listing of other colors available for the identified product and information regarding local inventory availability of the product. The information regarding local inventory for the product in screens 410 and 420 may be retrieved from a local database stored on the mobile device or a remote database stored on a server. Regardless of the location of the database, the inventory information may be personalized to the sales consultant user operating the mobile device.

Figure 5:
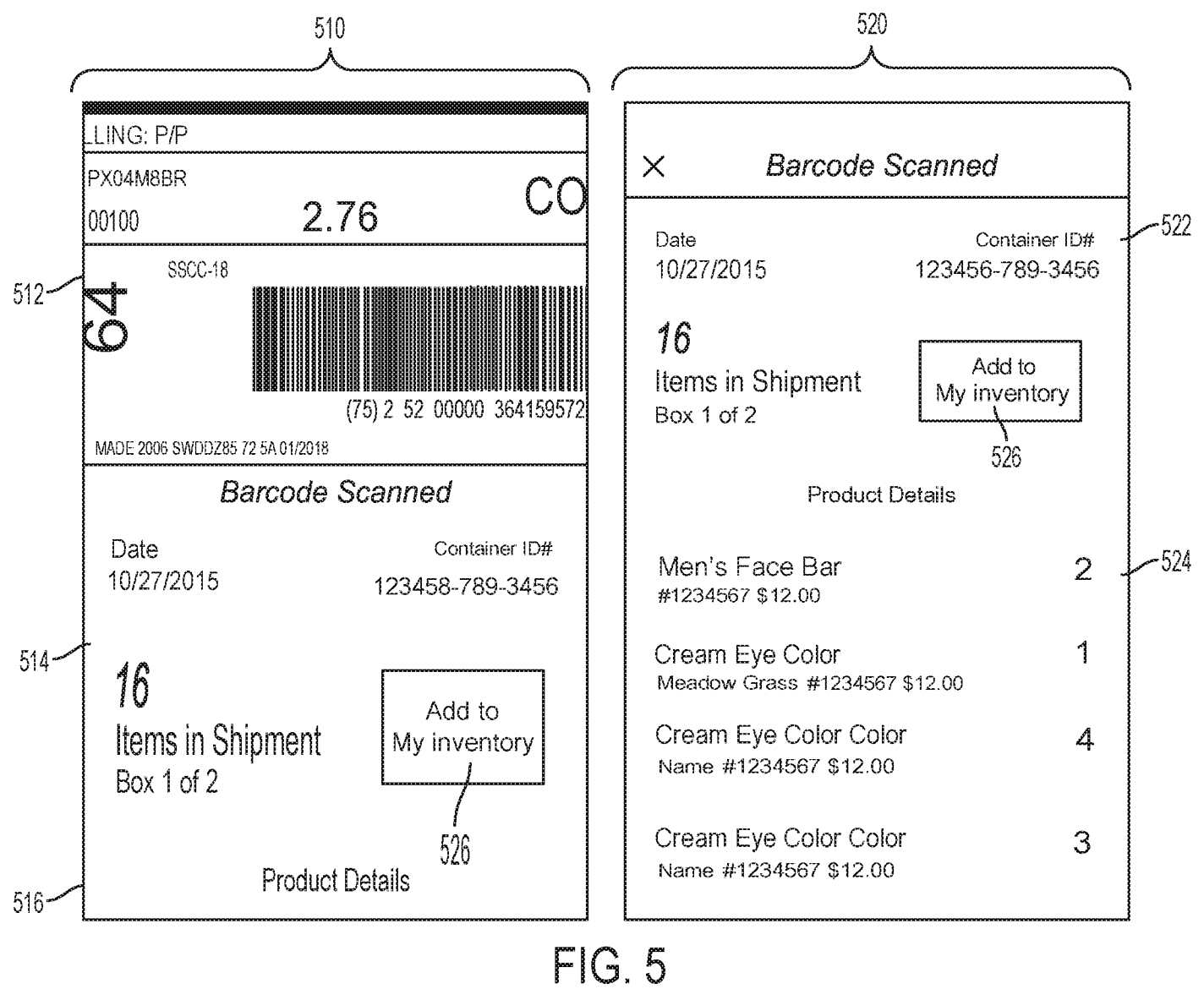

The camera of a mobile device may also or alternatively be used by the mobile application to assist a sales consultant user in tracking local inventory. For example, when the consultant's local inventory is replenished through received packages, the consultant may scan the package and the contents of the package identified and automatically updated in the database of local inventory. The contents of the replenishment package or other information regarding local inventory may be displayed in a user interface as shown in FIG. 5. FIG. 5 is a screenshot of an example use of a camera for identifying contents of a replenishment shipment according to one embodiment of the disclosure. A first screen 510 may include a portion or all of the picture taken by the user in a first area 512 and include an identification of the package in a second area 514. For example, when a barcode for the package is identified in the picture, the second area 514 may include information regarding the package, such as date shipped, number of items in shipment, and/or tracking information for the package. A button 516 may be activated to provide further information regarding the replenishment goods in a second screen 520. For example, the second screen 520 may include a first area 522 displaying the package details similar to area 514 of the first screen 510, such as to provide continuity between the screens 510 and 520, while additional information is displayed in a second area 524. The second area 524 may include a listing of the actual items contained in the package and ready to be added to the consultant's local inventory. When a user clicks a button 526, the contents of the local inventory database are updated to reflect the contents of the replenishment package.

Figure 6A:
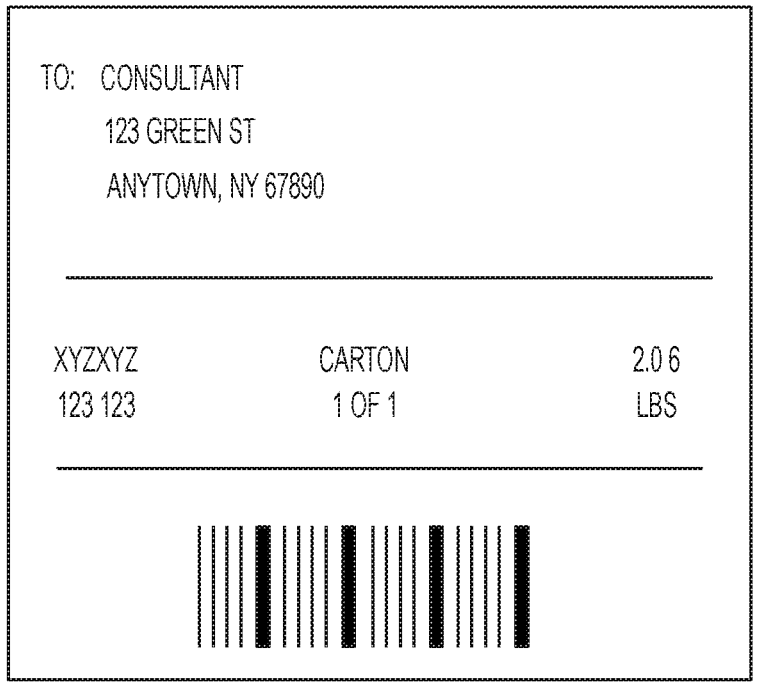
FIG. 6A is an illustration of a packing label with a barcode for tracking a replenishment shipment according to one embodiment of the disclosure.

The mobile device's camera may be used in different manners to capture information regarding a replenishment package. For example, a packaging label may be scanned to identify a package and its contents. An example packaging label is shown in FIG. 6A. FIG. 6A is an illustration of a packing label with a barcode for tracking a replenishment shipment according to one embodiment of the disclosure. In some embodiments, a barcode used by the shipping company may also be used to identify the package that may also be used by the mobile application to identify the package. For example, the shipping company tracking number may be stored by the supplier along with information about the replenishment products contained in the package. When the mobile application identifies the tracking number associated with the scanned barcode, the tracking number may be used to look-up information about the contents of the package. In another example, a separate barcode may be printed on a package, separate from the tracking information added by the shipping company. The barcode may contain encoded information regarding the contents of the package, or the barcode may contain an embedded identification number that may be used to look-up an associated list of package contents. Although a barcode is described in the described embodiments, the barcode may include any number of identification techniques, including conventional barcodes and QR barcodes.

Figure 6B:
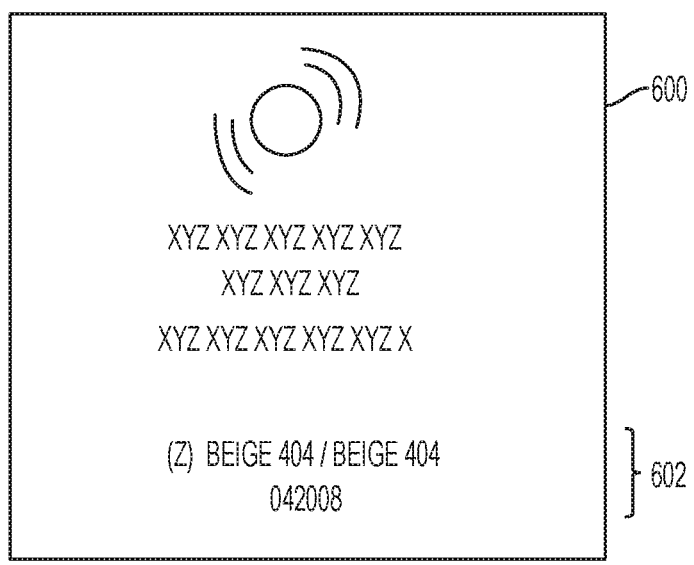
FIG. 6B is an illustration of a packing box with information for tracking a replenishment shipment according to one embodiment of the disclosure.

Another example packaging label is shown in FIG. 6B. FIG. 6B is an illustration of a packing box with information for tracking a replenishment shipment according to one embodiment of the disclosure. The camera may capture a box top or side of the replenishment goods or package and use information on the box to determine what goods were received. For example, a consultant may take a picture of each of the goods in the replenishment package, and information on the goods used to identify the products and update local inventory. As shown in FIG. 6B, the goods may include a description 602 on a box 600 that may be used to identify the product. The description 602 may include a product SKU number or a text description of the product, either of which may be recognized by performing optical character recognition (OCR) on the picture.

Figure 7:
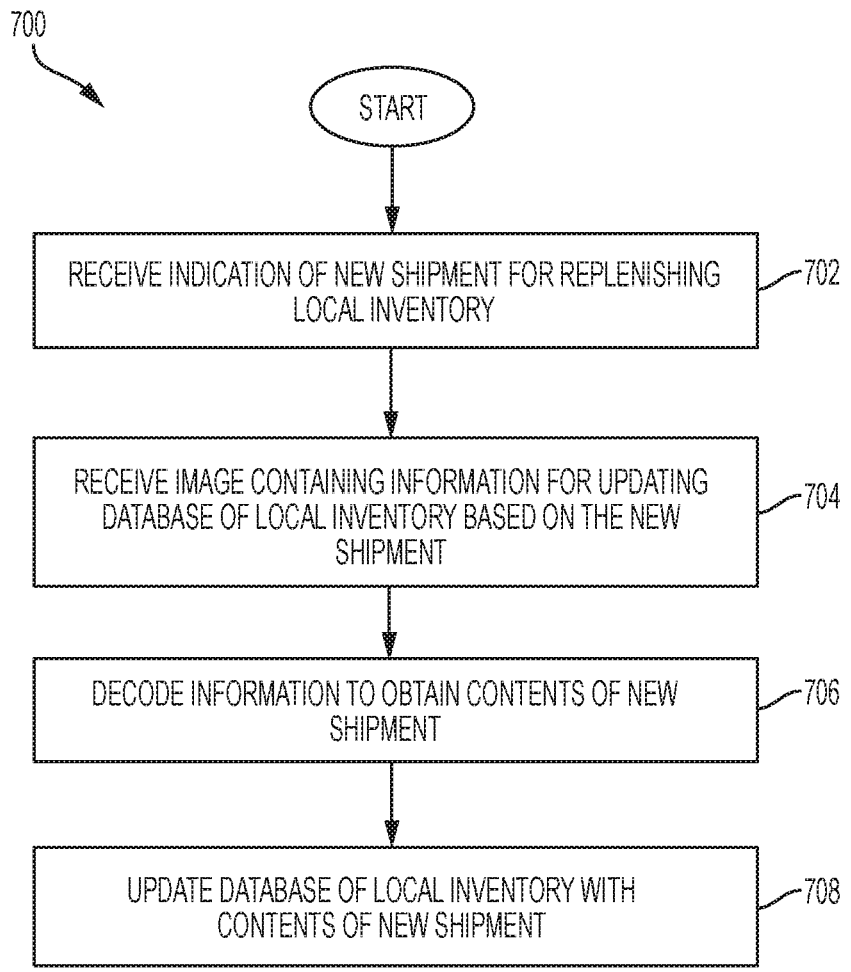
FIG. 7 is a flow chart illustrating an example method for tracking local inventory for a sales consultant user according to one embodiment of the disclosure.

An example method for managing local inventory by updating a database when new replenishment shipments are received as described above is shown in FIG. 7. FIG. 7 is a flow chart illustrating an example method for tracking local inventory for a sales consultant user according to one embodiment of the disclosure. A method 700 may begin at block 702 with receiving an indication of a new shipment for replenishing local inventory. Block 702 may include, for example, receiving input from a user that a package has arrived or receiving a picture taken by a user. Then, at block 704, an image is received that contains information for updating a database of local inventory to reflect contents of the shipment. Block 704 may include, for example, identifying a tracking number, a QR code, a barcode, a product label, or the like. Next, at block 706, that information is decoded to obtain contents of the replenishment shipment. For example, the QR code may be decoded to obtain a listing of goods in the package. As another example, the tracking number may be used to look-up contents associated with the package from a supplier's database. Then, at block 708, the database of the local inventory is updated with contents of the new shipment.

Figure 8:
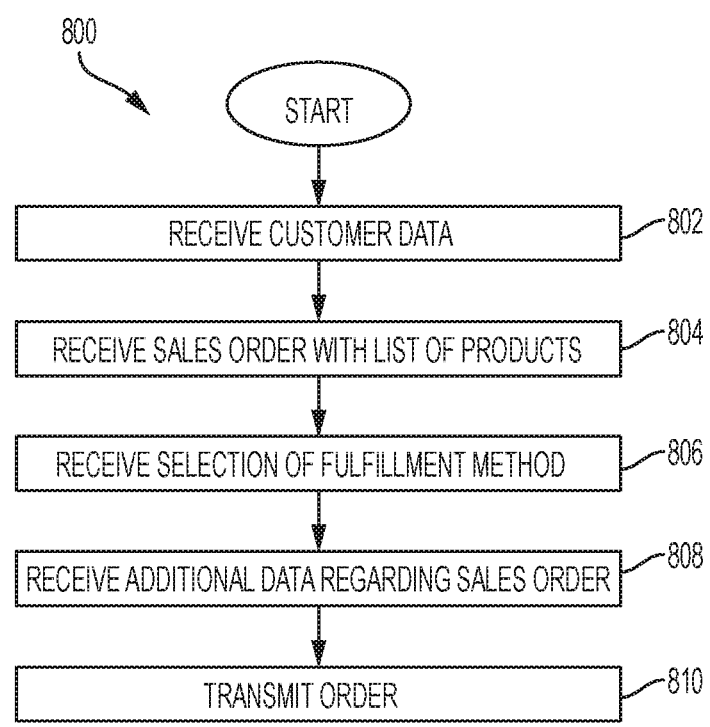
FIG. 8 is a flow chart illustrating an example method for placing an order with a sales consultant user according to one embodiment of the disclosure.

The mobile application may also or alternatively be used to enter and track sales orders associated with the sales consultant user. Through the user interface, the consultant may be able to fulfill orders through several fulfillment methods, some of which may include the consultant's local inventory. One example method for obtaining orders is shown in and described with reference to FIG. 8. FIG. 8 is a flow chart illustrating an example method for placing an order with a sales consultant user according to one embodiment of the disclosure. A method 800 begins at block 802 with receiving customer data, such as customer name, customer address, customer birthday, etc. Then, at block 804, a sales order may be received for a customer identified at block 802. The sales order may include a list of products desired by the customer, an indication of payment for the products, and other information regarding the sales order. Alternatively, the received sales order may be a re-order of a previous sales order referenced by an order identifier. Next, at block 806, a selection of a fulfillment method may be received that corresponds to the sales order of block 804. Several fulfillment methods may be available including, for example, fulfillment from a central warehouse and fulfillment from local inventory. Further, a combination of fulfillment methods may be used to complete a sales order. Then, at block 808, additional data regarding a sales order may be received, such as discount, shipping information, and/or estimated tax information. Next, at block 810, the sales order may be transmitted. For example, when blocks 802, 804, 806, and 810 are performed through a mobile application of a mobile device, block 808 may include transmitting the sales order to a server, for example, for recording the order and/or verifying payment information for the sales order.

Referring back to block 806 regarding selection of a fulfillment method, when a sales order may be completely filled from local inventory, the sales consultant user may accept payment and distribute the goods, such as by shipping or personally delivering items from the sales order from local inventory. If complete fulfillment from local inventory is not available, partial delivery may be made from local inventory. If the sales consultant user does not have certain products in local inventory, she can designate items in the sales order that have been delivered. The sales order may remain pending while a replenishment package is obtained to stock local inventory with the remaining items, from which the sales order may be completed.

The sales consultant user may also choose to fulfill sales orders through other options. For example, sales orders may be filled from a warehouse that services multiple sales consultant users. The warehouse may fulfill the sales order through one of several methods. One manner may be a customer delivery service (CDS) that fulfills sales orders by a supplier on behalf of the sales consultant users. Another manner may be an EZShip service that fulfills sales orders by the supplier on behalf of the sales consultant users. Orders for fulfillment from a central warehouse may be received by entry from a sales consultant user into the mobile application or through another channel, such as an Internet web page associated with the sales consultant user. In addition to these sales order fulfilment processes, a guest checkout may be available. This order type may involve a customer shopping on a sales consultant user's personal web site who does not register as a customer, but places an order and selects to check out as a guest. This order may be fulfilled from the warehouse by the supplier on behalf of the sales consultant user. Sales consultants are actively involved in sales transactions with customers for each of the CDS, EZShip, and guest checkout options.

Figure 9:
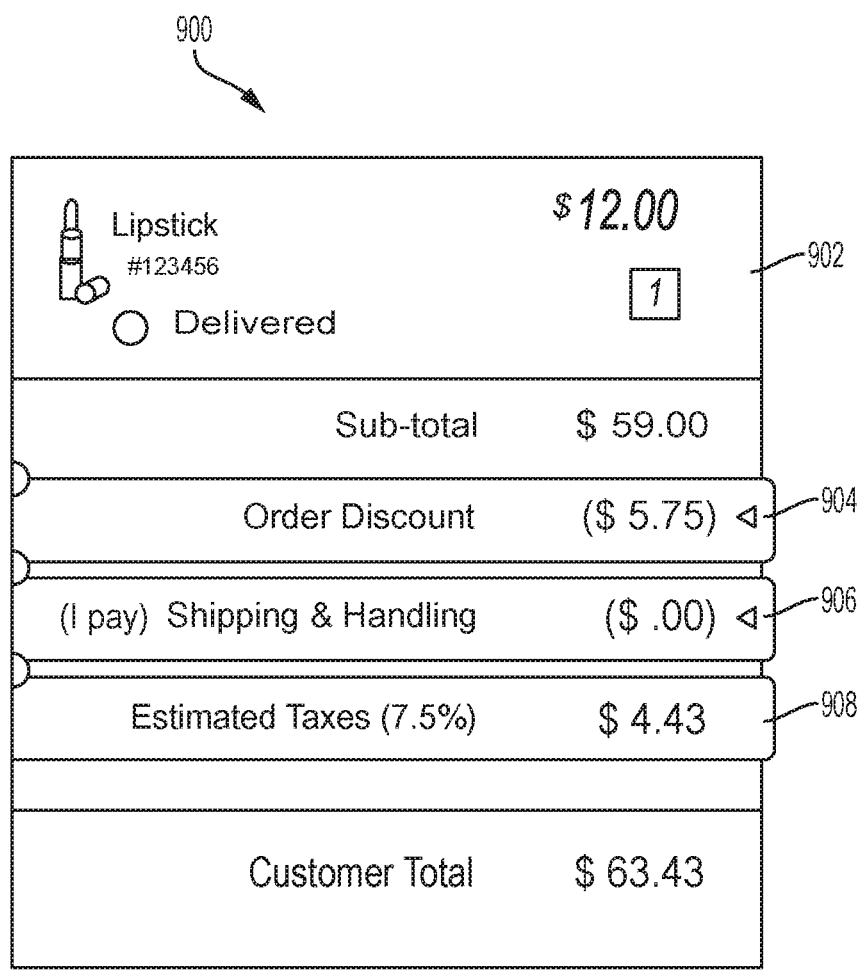
FIG. 9 is a screenshot of an example use of a mobile device to complete an order according to one embodiment of the disclosure.

Referring back to block 808 of FIG. 8, when sales orders are received through the mobile application or other channels, a sales consultant user may specify certain aspects of the sales order by providing additional information regarding the sales order. FIG. 9 is a screenshot of an example use of a mobile device to complete an order according to one embodiment of the disclosure. A user interface 900 illustrates completion of a sales order through a mobile application. A first area 902 of the user interface 900 shows the products selected for the order, including quantity, price, and delivery status. Other aspects of the sales order may be specified by the sales consultant user, including a discount in area 904, a shipping cost in area 906, and/or estimated taxes in area 908.

Figure 10:
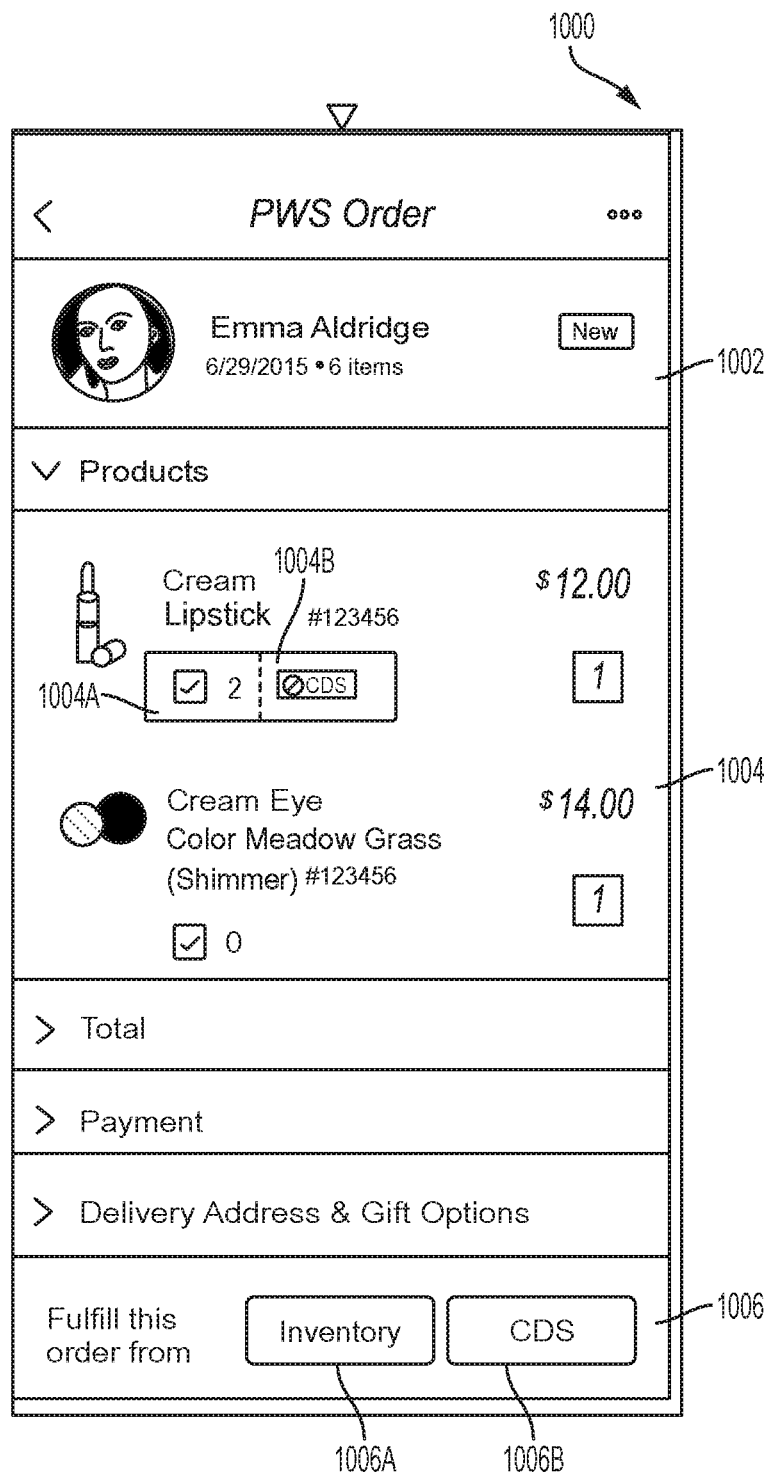
FIG. 10 is a screenshot of an example use of a mobile device to determine fulfillment methods for parts of an order according to one embodiment of the disclosure.

Fulfillment and local inventory information may be displayed in a user interface along with the sales order. FIG. 10 is a screenshot of an example use of a mobile device to determine fulfillment methods for parts of an order according to one embodiment of the disclosure. A user interface 1000 may include a first area 1002 indicating a customer associated with a sales order displace in a second area 1004. The second area 1004 may display individual products that are part of the sales order, along with, for example, a requested quantity and retail price. The second area 1004 may also include, for some or all of the products, local inventory information and information regarding available fulfillment manners. The example of interface 1000 illustrates in region 1004A that one of the ordered products has two units available in local inventory and that the product is not available through CDS fulfilment. The example of interface 1000 illustrates in region 1004B that one of the ordered products has no units available in local inventory. A third area 1006 allows the consultant to determine a fulfillment manner for the sales order. For example, the consultant may determine to fulfill the order, or portions of the order, from local inventory by selecting button 1006A or to fulfill the order, or portions of the order, from CDS by selecting button 1006B.

Figure 11:
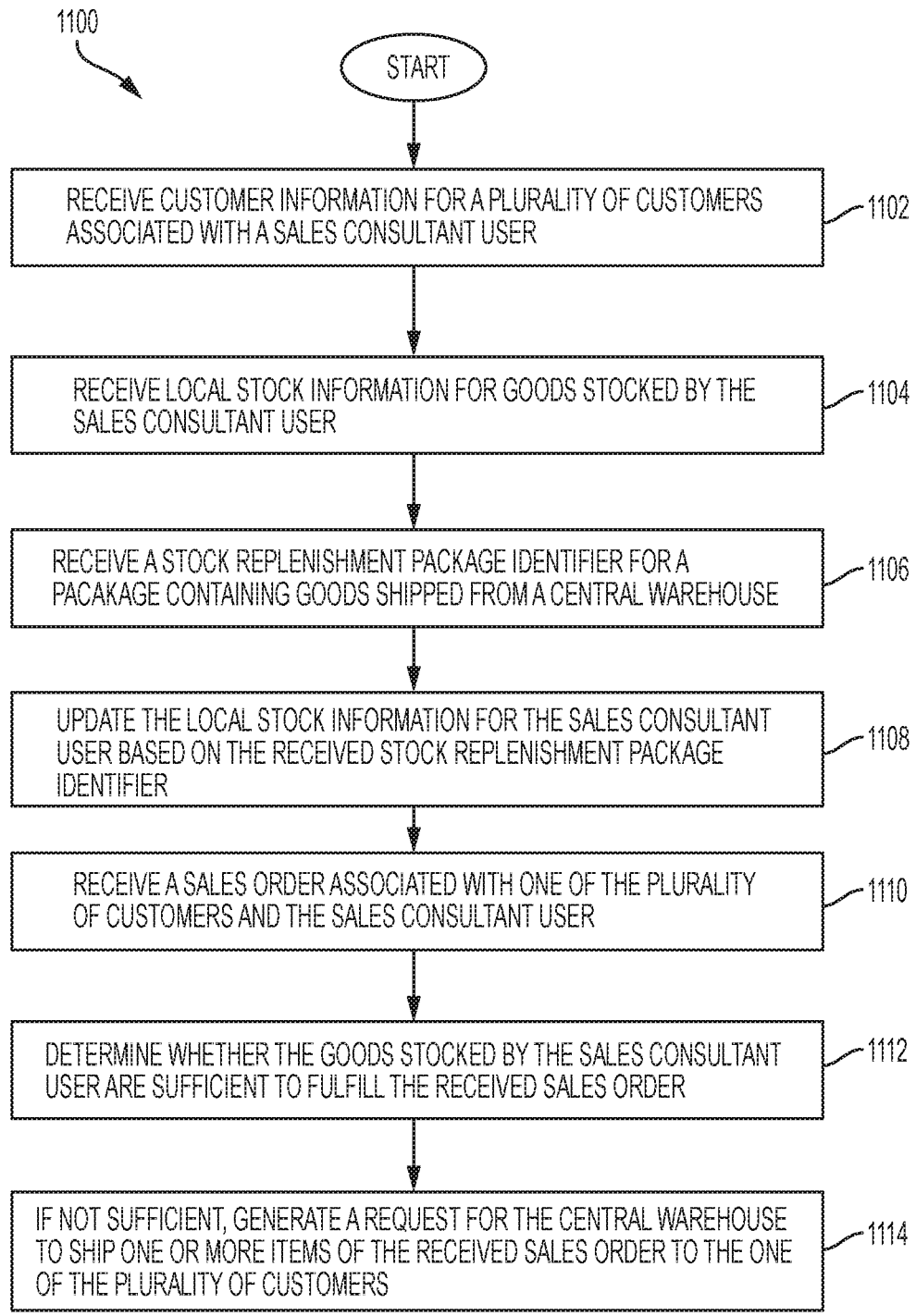
FIG. 11 is a flow chart illustrating an example method for fulfilling an order using multiple available fulfillment methods according to one embodiment of the disclosure.

Several embodiments of a mobile application, operation of a mobile device, and communication between the mobile device and a server have been described above. These embodiments include technological improvements that allow a mobile application to track local inventory, assist a sales consultant user in managing and replenishing local inventory, and assist a sales consultant user in fulfilling sales orders using local inventory. One example method that combines aspects of these technological improvements is described with reference to FIG. 11. FIG. 11 is a flow chart illustrating an example method for fulfilling an order using multiple available fulfillment methods according to one embodiment of the disclosure. A method 1100 may be executed by a mobile application executing on a mobile device and communicating with a server.

The method 1100 may begin at block 1102 with receiving customer information for one or more customers associated with a sales consultant user. For example, an address book may be imported into the mobile application or contacts may be manually input into the application. Then, at block 1104, local stock information may be received for goods stocked by the sales consultant user. For example, a sales consultant user may input information regarding current stock available in local inventory. The information of blocks 1102 and 1104 may be input to the mobile application such as by accessing menus within the user interface 200 of FIG. 2.

Next, at block 1106, the local inventory may be replenished, and an identifier for the replenishment package received, such as from a camera. That identifier may be used to uniquely identify a package shipped to the sales consultant user and may be used to look-up information regarding goods shipped from a central warehouse in the package. The replenishment package identifier may be received as, for example, a picture of a packing label or a picture of a product box as described with reference to the embodiments of FIG. 5, FIG. 6A, and FIG. 6B. At block 1108, the local stock information may be updated in the inventory database associated with the sales consultant user. Block 1108 may update a database stored on the mobile device and/or update a database stored on a remote server.

Next, at block 1110, a sales order may be received that is associated with one of the plurality of customers from block 1102 and associated with the sales consultant user. Then, at block 1112, it is determined whether the goods stocked by the sales consultant user in the local inventory are sufficient to fulfill the received sales order. If so, then a packing slip may be generated that lists items of the sales order with shipping information for the associated customer. If not all goods can be delivered from local inventory, then, at block 1114, a request may be generated and transmitted to a remote server indicating one or more items from the received sales order that should be fulfilled from a central warehouse and shipped to the customer. Items not fulfilled by the central warehouse may be delivered by hand or shipped by the sales consultant user. The sales order may be received and fulfilment methods determined through, for example, embodiments of a mobile application described with reference to the embodiments of FIG. 9 and FIG. 10.

As sales orders are fulfilled through local inventory and a consultant's local inventory is known, the mobile application may notify the consultant of times for replenishment packages and products to be included in a replenishment package may be determined for the consultant. The consultant may allow the replenishment to occur automatically, or the consultant may receive notifications when a replenishment package is suggested along with being presented suggested products for the replenishment package for the consultant's approval.

Figure 12:
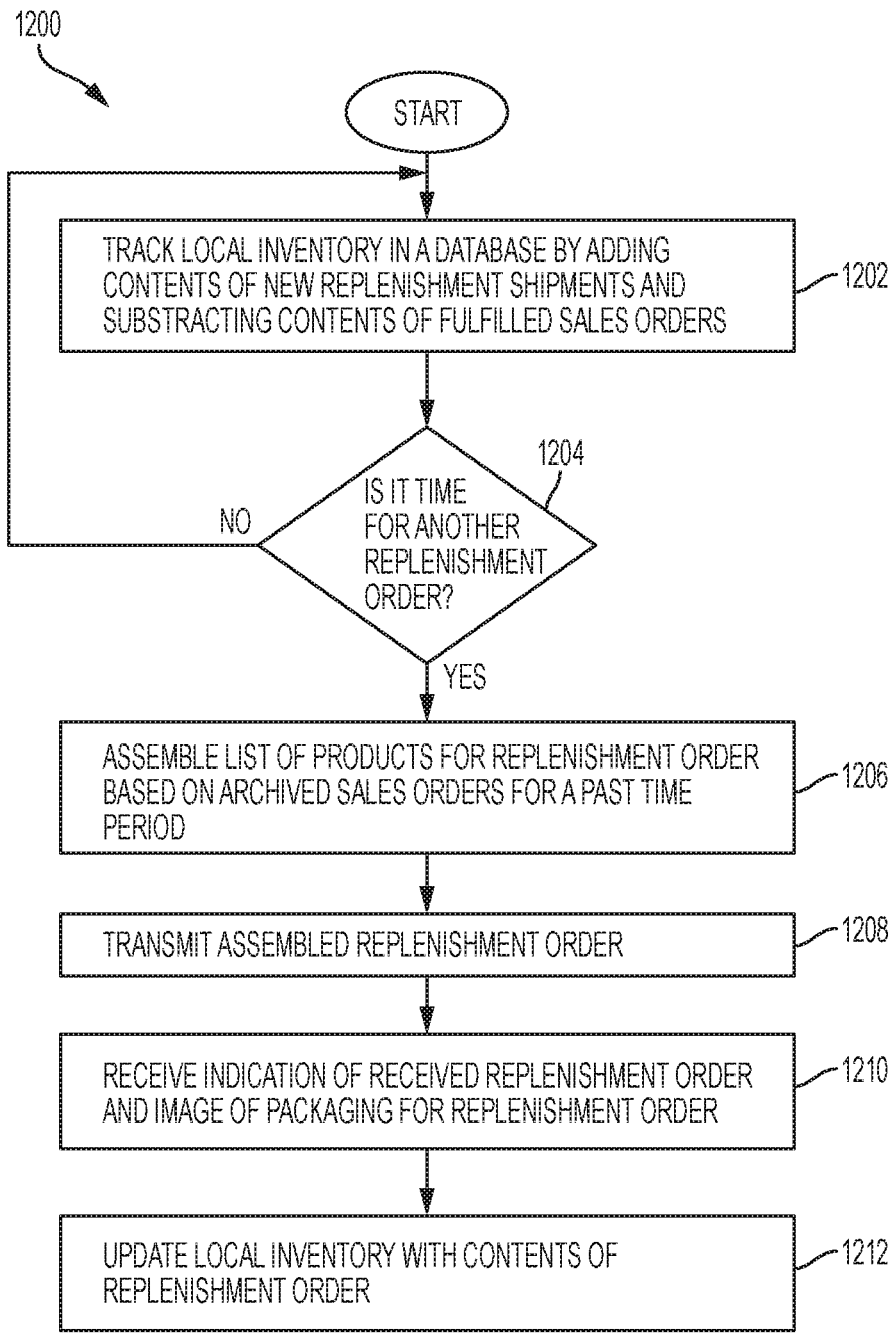
FIG. 12 is a flow chart illustrating an example method for determining contents of a replenishment order for a sales consultant user according to one embodiment of the disclosure.

One method for automatically determining placing a replenishment order is shown in FIG. 12. FIG. 12 is a flow chart illustrating an example method for determining contents of a replenishment order for a sales consultant user according to one embodiment of the disclosure. A method 1200 may begin at block 1202 with tracking local inventory in a database by adding contents of replenishment packages and subtracting contents of fulfilled sales orders. Thus, a consultant's local inventory may be accurately known. Next, at block 1204, it is determined whether it is time for another replenishment order. For example, block 1204 may include determining an amount of time since the last replenishment package was received. As another example, block 1204 may include determining which products are out of stock in the local inventory. As a further example, block 1204 may include determining a number of items that are out of stock and the popularity of each of the out-of-stock items. If it is not determined to be time to replenish local inventory, the method 1200 proceeds back to block 1202 to continue tracking local inventory and waiting for a determination that a replenishment package should be requested.

If it is determined to be time to replenish local inventory, the method 1200 proceeds to block 1206 to assemble a list of products for a replenishment order. The list may be assembled based, at least in part, on archived sales orders for a certain past time period. For example, the replenishment order may include re-stocking of items that were recently delivered from local inventory. At block 1208, the assembled list of products may be transmitted to a server and communicated to a supplier that will ship a replenishment package to the consultant. An indication of a received replenishment order is received at block 1210, along with an image of the packaging for updating local inventory. The image may be processed, such as described in embodiments of FIG. 5, FIG. 6A, and FIG. 6B, to update local inventory with the contents of the replenishment order at block 1212.

Figure 13:
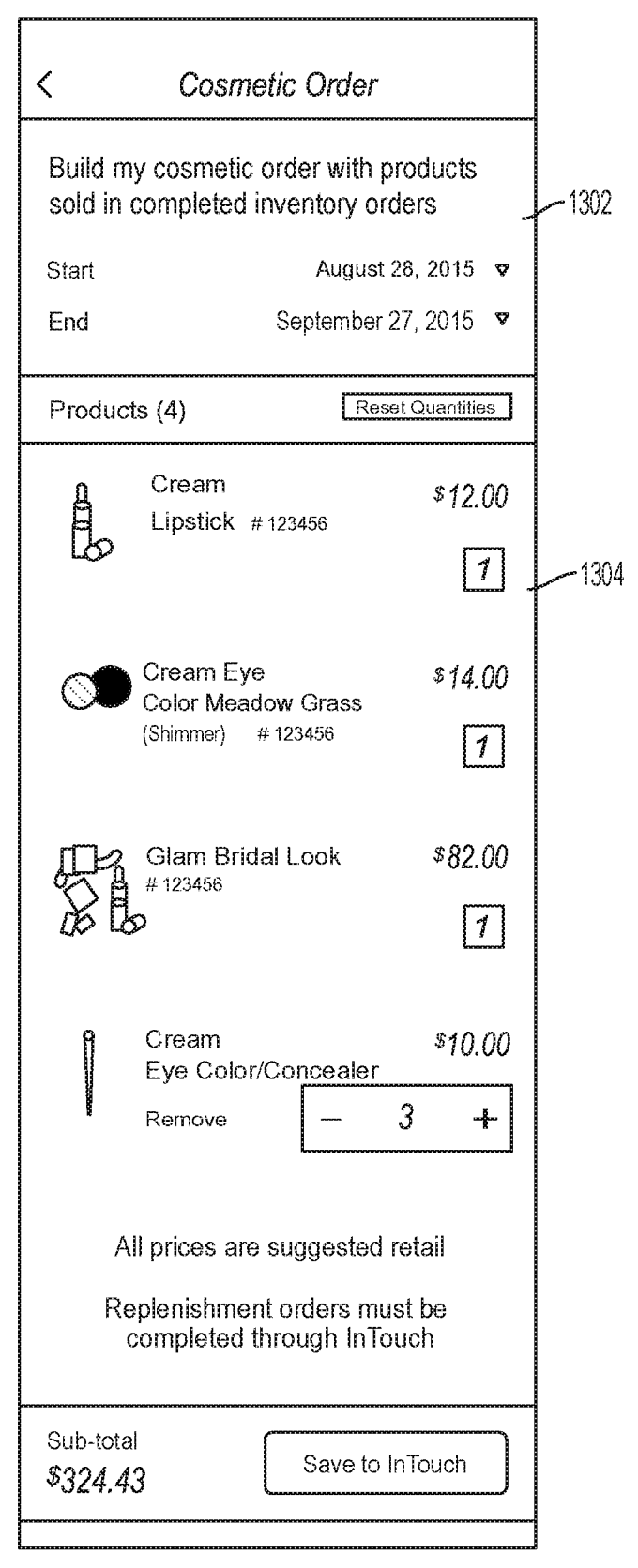

Referring to assembling products for a replenishment order at block 1206 of FIG. 12, an example of a generated replenishment order is shown in FIG. 13. FIG. 13 is a screenshot of an example use of a mobile device to specify a replenishment order according to one embodiment of the disclosure. A sales consultant user may select a button on an inventory screen of the mobile application to begin a replenishment process. This will execute a function that will create a suggested inventory replenishment order based on recent sales orders fulfilled by the sales consultant user. The suggested inventory replenishment order may be generated through a user interface 1300. The user interface 1300 may include a first area 1302 allowing a consultant to specify start and end dates for reviewing archived sales orders to determine products for a replenishment package. After receiving a date range for sales orders (such as the past month or past quarter), goods may be identified from the sales orders in the selected time period and used to generate a list shown in second area 1304, which may be all items sold between the identified start and end dates. This list may be used as the basis for a replenishment order. In one embodiment, the sales consultant user may be directed to an online ordering system on the Internet to complete the inventory replacement order. The sales consultant user can edit the order to change quantities add/remove items prior to completing the purchasing of the items to replenish her inventory. The sales consultant may remain in complete control of the replenishment order at all times until it is processed. In another embodiment, the sales consultant user may change quantities and add/remove items in the mobile application, and then the mobile application may automatically send the list to a server to start a replenishment shipment.

Figure 14:
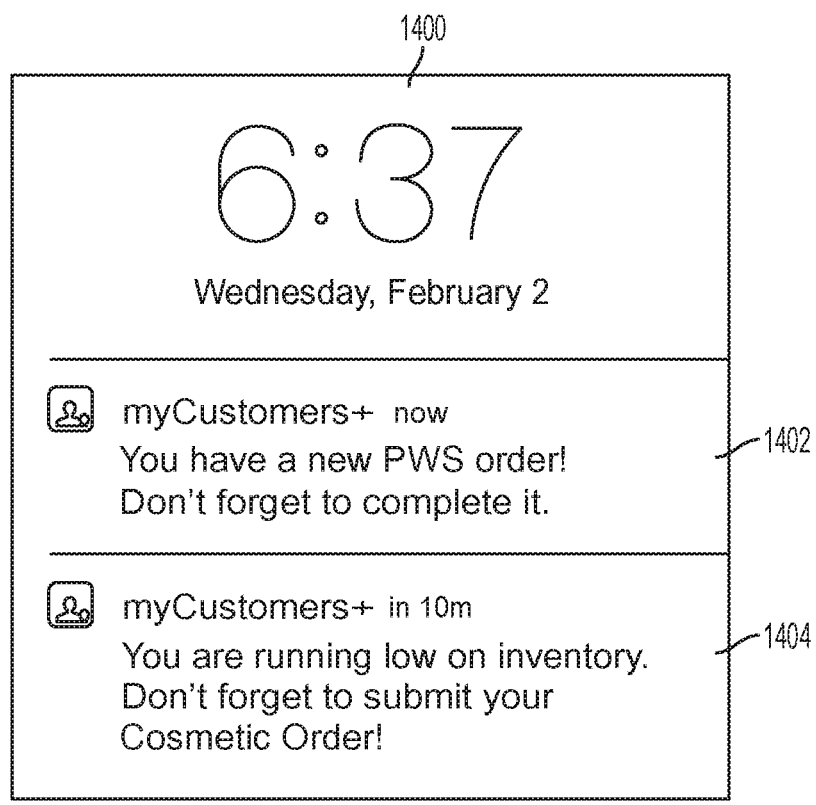
FIG. 14 is a screenshot of example push notifications providing information regarding local inventor to a sales consultant user according to one embodiment of the disclosure.

Referring to determining it is time for another replenishment order at block 1204, a consultant may be notified through their mobile device that a replenishment order should be started. One example of such a notification is a push notification received by a mobile device and displayed in a notification list of the mobile device. FIG. 14 is a screenshot of example push notifications providing information regarding local inventor to a sales consultant user according to one embodiment of the disclosure. A user interface 1400 may include notifications 1402 and 1404 produced by embodiments of the mobile application described herein. A notification 1404 may indicate time for a replenishment order. Clicking on the notification 1404 may take the consultant to the user interface 1300 of FIG. 13. A notification 1402 may indicate a sales order has been received that requires the consultant's attention. Clicking on the notification 1402 may take the consultant to the user interface 1000 of FIG. 10 to assign a fulfilment method to the sales order or portions of the sales order.

The schematic flow chart diagrams of FIG. 7, FIG. 8, FIG. 11, and FIG. 12 are generally set forth as a logical flow chart diagram. As such, the depicted order and labeled steps are indicative of aspects of the disclosed method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagram, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The operations described above may be performed by any circuit configured to perform the described operations. Such a circuit may be an integrated circuit (IC) constructed on a semiconductor substrate and include logic circuitry, such as transistors configured as logic gates, and memory circuitry, such as transistors and capacitors configured as dynamic random access memory (DRAM), electronically programmable read-only memory (EPROM), or other memory devices. The logic circuitry may be configured through hard-wire connections or through programming by instructions contained in firmware. Further, the logic circuity may be configured as a general purpose processor capable of executing instructions contained in software.

If implemented in firmware and/or software, functions described above may be stored as one or more instructions or code on a computer-readable medium. Examples include non-transitory computer-readable media encoded with a data structure and computer-readable media encoded with a computer program. Computer-readable media includes physical computer storage media. A storage medium may be any available medium that can be accessed by a computer. By way of example, and not limitation, such computer-readable media can comprise random access memory (RAM), read-only memory (ROM), electrically-erasable programmable read-only memory (EEPROM), compact disc read-only memory (CD-ROM) or other optical disk storage, magnetic disk storage or other magnetic storage devices, or any other medium that can be used to store desired program code in the form of instructions or data structures and that can be accessed by a computer. Disk and disc includes compact discs (CD), laser discs, optical discs, digital versatile discs (DVD), floppy disks and Blu-ray discs. Generally, disks reproduce data magnetically, and discs reproduce data optically. Combinations of the above should also be included within the scope of computer-readable media.

In addition to storage on computer readable medium, instructions and/or data may be provided as signals on transmission media included in a communication apparatus. For example, a communication apparatus may include a transceiver having signals indicative of instructions and data. The instructions and data are configured to cause one or more processors to implement the functions outlined in the claims.

Although the present disclosure and certain representative advantages have been described in detail, it should be understood that various changes, substitutions and alterations can be made herein without departing from the spirit and scope of the disclosure as defined by the appended claims. Moreover, the scope of the present application is not intended to be limited to the particular embodiments of the process, machine, manufacture, composition of matter, means, methods and steps described in the specification. For example, although mobile devices with and mobile applications executing on general purpose central processor units (CPUs) are described throughout the detailed description, aspects of the invention may be applied to the execution of other software executing on other processors, such as graphics processing units (GPUs) and digital signal processors (DSPs). As one of ordinary skill in the art will readily appreciate from the present disclosure, processes, machines, manufacture, compositions of matter, means, methods, or steps, presently existing or later to be developed that perform substantially the same function or achieve substantially the same result as the corresponding embodiments described herein may be utilized. Accordingly, the appended claims are intended to include within their scope such processes, machines, manufacture, compositions of matter, means, methods, or steps.

What is claimed is:

1. A method, comprising:
   receiving customer information for a plurality of customers associated with a sales consultant user;
   receiving local stock information for goods stocked by the sales consultant user;
   receiving a stock replenishment package identifier for a package containing goods shipped from a central warehouse;
   updating the local stock information for the sales consultant user based, at least in part, on the received stock replenishment package identifier;
   receiving a sales order for one of the plurality of customers;
   determining whether goods stocked by the sales consultant user listed in the local stock information are sufficient to fulfill the received sales order;
   transmitting a request for the central warehouse to ship one or more items of the received sales order to the one of the plurality of customers on behalf of the sales consultant user when goods stocked by the sales consultant user are determined to not be sufficient to fulfill the received sales order;
   updating the local stock information for the sales consultant user based, at least in part, on the received sales order and the transmitted request to reflect delivery of at least a portion of the received sales order from the goods stocked by the sales consultant user;
   receiving a push notification reminder to place a replenishment order to restock the goods stocked by the sales consultant user;
   receiving a start and end date for archived sales orders from which to generate a replenishment order; and
   transmitting a replenishment order for the central warehouse to restock the goods stocked by the sales consultant user, wherein the replenishment order comprises one or more items selected from archived sales orders dated between the received start and end date.

2. The method of claim 1, further comprising, when goods stocked by the sales consultant user are sufficient, generating a packing slip listing items of the sales order with shipping information for the one of the plurality of customers.

3. The method of claim 2, further comprising associating the sales order with the received customer information including important dates, spouse, name, contact information, and EZShip status.

4. The method of claim 1, wherein the received stock replenishment package identifier is received from a camera.

5. The method of claim 4, wherein the received stock replenishment package identifier comprises at least one of a barcode and a QR code.

6. The method of claim 1, further comprising:
   storing the received customer information and the received sales order in a local sales database;
   receiving a text string from a user;
   searching the local sales database with the received text string; and
   displaying results of the searching of the local sales database.

7. The method of claim 1, wherein the received sales order comprises a reorder of a previous purchase from one of the plurality of customers.

8. The method of claim 1, further comprising:
   receiving a discount amount to apply to the received sales order; and
   receiving a tax percentage to apply to the received sales order.

9. The method of claim 1, further comprising associating a to-do task or a reminder with one of the plurality of customers.

10. A computer program product, comprising:
    a non-transitory computer readable medium comprising code to perform steps comprising:
       receiving customer information for a plurality of customers associated with a sales consultant user;
       receiving local stock information for goods stocked by the sales consultant user;

receiving a stock replenishment package identifier for a package containing goods shipped from a central warehouse;

updating the local stock information for the sales consultant user based, at least in part, on the received stock replenishment package identifier;

receiving a sales order for one of the plurality of customers;

determining whether goods stocked by the sales consultant user listed in the local stock information are sufficient to fulfill the received sales order;

transmitting a request for the central warehouse to ship one or more items of the received sales order to the one of the plurality of customers on behalf of the sales consultant user when goods stocked by the sales consultant user are determined to not be sufficient to fulfill the received sales order;

updating the local stock information for the sales consultant user based, at least in part, on the received sales order and the transmitted request to reflect delivery of at least a portion of the received sales order from the goods stocked by the sales consultant user;

receiving a push notification reminder to place a replenishment order to restock the goods stocked by the sales consultant user;

receiving a start and end date for archived sales orders from which to generate a replenishment order; and transmitting a replenishment order for the central warehouse to restock the goods stocked by the sales consultant user, wherein the replenishment order comprises one or more items selected from archived sales orders dated between the received start and end date.

11. The computer program product of claim 10, wherein the medium further comprises code to perform steps comprising, when goods stocked by the sales consultant user are sufficient, generating a packing slip listing items of the sales order.

12. The computer program product of claim 11, wherein the medium further comprises code to perform steps comprising associating the sales order with the received customer information including important dates, spouse, name, contact information, and EZShip status.

13. The computer program product of claim 10, wherein the medium further comprises code to perform steps comprising receiving the stock replenishment package identifier from a camera, and wherein the stock replenishment package identifier comprises one of a barcode and a QR code.

14. The computer program product of claim 10, wherein the medium further comprises code to perform steps comprising:
receiving a discount amount to apply to the received sales order; and
receiving a tax percentage to apply to the received sales order.

15. The computer program product of claim 10, wherein the medium further comprises code to perform steps comprising associating a to-do task or a reminder with one of the plurality of customers.

16. An apparatus, comprising:
memory; and
a processor coupled to the memory, wherein the processor is configured to perform steps comprising:
receiving customer information for a plurality of customers associated with a sales consultant user;
receiving local stock information for goods stocked by the sales consultant user;
receiving a stock replenishment package identifier for a package containing goods shipped from a central warehouse;
updating the local stock information for the sales consultant user based, at least in part, on the received stock replenishment package identifier;
receiving a sales order for one of the plurality of customers;
determining whether goods stocked by the sales consultant user listed in the local stock information are sufficient to fulfill the received sales order;
transmitting a request for the central warehouse to ship one or more items of the received sales order to the one of the plurality of customers on behalf of the sales consultant user when goods stocked by the sales consultant user are determined to not be sufficient to fulfill the received sales order;
updating the local stock information for the sales consultant user based, at least in part, on the received sales order and the transmitted request to reflect delivery of at least a portion of the received sales order from the goods stocked by the sales consultant user;
receiving a push notification reminder to place a replenishment order to restock the goods stocked by the sales consultant user;
receiving a start and end date for archived sales orders from which to generate a replenishment order; and
transmitting a replenishment order for the central warehouse to restock the goods stocked by the sales consultant user, wherein the replenishment order comprises one or more items selected from archived sales orders dated between the received start and end date.

17. The apparatus of claim 16, wherein the processor is further configured to perform steps comprising, when goods stocked by the sales consultant user are sufficient, generating a packing slip listing items of the sales order.

18. The apparatus of claim 17, wherein the processor is further configured to perform steps comprising associating the sales order with the received customer information including important dates, spouse, name, contact information, and EZShip status.

19. The apparatus of claim 16, wherein the processor is further configured to perform steps comprising receiving the stock replenishment package identifier from a camera, and wherein the stock replenishment package identifier comprises one of a barcode and a QR code from a shipping label.

20. The apparatus of claim 16, wherein the processor is further configured to perform steps comprising:
receiving a discount amount to apply to the received sales order; and
receiving a tax percentage to apply to the received sales order.

21. The method of claim 1, further comprising:
receiving an indication from the sales consultant user to fulfill portions of the received sales order from the central warehouse or from the goods stocked by the sales consultant user,
wherein the step of transmitting the request for the central warehouse comprises transmitting a request for the central warehouse to ship first items of the received sales order to the one of the plurality of customers when goods stocked by the sales consultant user are determined to not be sufficient to ship the first items and to ship second items of the received sales order to the one of the plurality of customers when the indication indicates a preference for fulfilling the second items from the central warehouse.

22. The computer program product of claim 10, wherein the medium further comprises code to perform the steps of receiving an indication from the sales consultant user to fulfill portions of the received sales order from the central warehouse or from the goods stocked by the sales consultant user, and wherein the code to perform the step of transmitting the request for the central warehouse comprises code to perform the steps of transmitting a request for the central warehouse to ship first items of the received sales order to the one of the plurality of customers when goods stocked by the sales consultant user are determined to not be sufficient to ship the first items and to ship second items of the received sales order to the one of the plurality of customers when the indication indicates a preference for fulfilling the second items from the central warehouse.

23. The apparatus of claim 16, wherein the processor is further configured to perform steps comprising:

receiving an indication from the sales consultant user to fulfill portions of the received sales order from the central warehouse or from the goods stocked by the sales consultant user, wherein the step of transmitting the request for the central warehouse comprises transmitting a request for the central warehouse to ship first items of the received sales order to the one of the plurality of customers when goods stocked by the sales consultant user are determined to not be sufficient to ship the first items and to ship second items of the received sales order to the one of the plurality of customers when the indication indicates a preference for fulfilling the second items from the central warehouse.

* * * * *